United States Patent
Wang et al.

(10) Patent No.: US 12,437,509 B2
(45) Date of Patent: Oct. 7, 2025

(54) MEDICAL IMAGE PROCESSING APPARATUS, METHOD, AND STORAGE MEDIUM

(71) Applicant: CANON MEDICAL SYSTEMS CORPORATION, Tochigi (JP)

(72) Inventors: Fuyue Wang, Beijing (CN); Yanhua Wang, Beijing (CN); Qilin Xiao, Beijing (CN)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 383 days.

(21) Appl. No.: 18/065,718

(22) Filed: Dec. 14, 2022

(65) Prior Publication Data

US 2023/0186603 A1    Jun. 15, 2023

(30) Foreign Application Priority Data

Dec. 15, 2021    (CN) .......................... 202111534705.8
Nov. 1, 2022    (JP) ................................ 2022-175338

(51) Int. Cl.
*G06V 10/764*    (2022.01)
*G06V 10/26*    (2022.01)
*G06V 10/77*    (2022.01)
*G06V 10/82*    (2022.01)

(52) U.S. Cl.
CPC .......... *G06V 10/764* (2022.01); *G06V 10/267* (2022.01); *G06V 10/7715* (2022.01); *G06V 10/82* (2022.01); *G06V 2201/031* (2022.01)

(58) Field of Classification Search
CPC .. G06V 10/764; G06V 10/7715; G06V 10/82; G06V 10/267
See application file for complete search history.

(56) References Cited

U.S. PATENT DOCUMENTS

| | | |
|---|---|---|
| 11,450,003 B2 | 9/2022 | Li et al. |
| 2020/0134825 A1 | 4/2020 | Li et al. |
| 2021/0233308 A1* | 7/2021 | Barasofsky ............. G06T 17/20 |
| 2022/0180514 A1* | 6/2022 | Vlasimsky ............... A61B 6/50 |

FOREIGN PATENT DOCUMENTS

| | | |
|---|---|---|
| CN | 111091573 A | 5/2020 |
| JP | 2020-68797 A | 5/2020 |

OTHER PUBLICATIONS

D. Keshwani et al. "TopNet: Topology Preserving Metric Learning for Vessel Tree Reconstruction and Labelling" Medical Image Computing and Computer Assisted Intervention—MICCAI 2020. Sep. 18, 2020, 12 pages.

* cited by examiner

*Primary Examiner* — David Perlman
(74) *Attorney, Agent, or Firm* — Oblon, McClelland, Maier & Neustadt, L.L.P.

(57) ABSTRACT

A medical image processing apparatus of an embodiment includes processing circuitry. The processing circuitry receives a medical image of a target region. The processing circuitry generates an image pair including a local image having local features of the target region and a global image having global features of the target region on the basis of the received medical image. The processing circuitry performs segmentation and classification of the target region on the image pair by a neural network.

9 Claims, 9 Drawing Sheets

MEDICAL IMAGE PROCESSING APPARATUS, METHOD, AND STORAGE MEDIUM

CROSS-REFERENCE TO RELATED APPLICATIONS

This application is based upon and claims the benefit of priority from Chinese Patent Application No. 202111534705.8, filed on Dec. 15, 2021; and Japanese Patent Application No. 2022-175338, filed on Nov. 1, 2022, the entire contents of all of which are incorporated herein by reference.

FIELD

Embodiments disclosed herein relate generally to a medical image processing apparatus, a method, and a storage medium.

Specifically, the present embodiment relates to a medical image processing apparatus, a method, and a storage medium for performing segmentation and classification of a target region (for example, a tubular structure) included in a medical image, and particularly, to a medical image processing apparatus, a method, and a storage medium for performing segmentation and classification on an image of a target region (for example, a tubular structure) by using a neural network.

BACKGROUND

Organs or tissue structures of the human body include, for example, tubular organs or tissue structures such as blood vessels and trachea. In this specification, these tubular organs or tissue structures are collectively referred to as tubular structures. Extraction and separation of tubular structures, such as blood vessels, through segmentation and classification, is an important part of disease diagnosis, evaluation, and treatment decisions.

In the related art, for example, traditional methods such as Hessian Matrix, graph cut, and vascular structure matching have been used to extract and separate tubular structures. It has also been proposed to combine deep learning methods with traditional methods to perform extraction and separation of tubular structures at independent steps.

There are proposed several blood vessel segmentation methods based on deep learning. For example, there are known methods and systems for segmentation of pulmonary vessels in CT images based on deep learning. This includes a segmentation step of blood vessels and an arteriovenous identification step of the blood vessels, and can combine an arteriovenous probability map obtained by arteriovenous identification of the blood vessels with rudimentary segmentation results of the blood vessels to segment intrapulmonary small vessels and extrapulmonary large vessels as well as to identify arteries and veins.

There are also proposed multi-stage extraction techniques for other structures in the body. For example, there is known a technique for extracting an image of a target cross section from image data collected by a medical image diagnostic apparatus, at high speed with a small amount of calculation. Specifically, for a plurality of cross-sectional images with different sizes, the image size is converted to match an input image size of a learned model, and multi-stage extraction of structures in the cross-sectional image is performed by the learned model. More specifically, when the target is a fetus in the abdomen of the human body and the target cross section includes a first structure and a second structure located inside the first structure, a target cross-sectional image for learning in learning data includes an image of the first structure and an image of the second structure. In this case, an image in which a partial region including the first structure in the target cross-sectional image is cut out and enlarged can be used as a cross-sectional image of the region of interest for learning. When the first structure is detected by applying the learned model to the cross-sectional image obtained from the image data, the second structure can be detected by cutting out a region including the first structure from the cross-sectional image, producing an image, and applying the learned model to the cut-out image.

DETAILED DESCRIPTION

The related art may be unable to provide more accurate extraction performance for tubular structures such as blood vessels because of the methods for extraction and separation on the tubular structures. Particularly, methods that combine deep learning with traditional post-processing methods may fail to separate and extract tubular structures such as blood vessels because deep learning processing and post-processing are respectively performed in separate steps and thus parameters need to be adjusted based on many assumptions.

The present embodiment is proposed to solve the above problems of the related art. Specifically, the present embodiment provides a method and apparatus for image segmentation classification of a target region (for example, a tubular structure) that simultaneously performs segmentation and classification of the target region (for example, a tubular structure), and combines local features and global features of an image including the target region (for example, a tubular structure) to complete fine extraction and separation of the target region (for example, a tubular structure) without requiring traditional post-processing.

In the present embodiment, first, an image pair reflecting local features and global features is produced in preprocessing, and then segmentation and classification of the target region (for example, a tubular structure) based on a deep learning method that combines both the local features and the global features are performed, so that the target region (for example, a tubular structure) can be extracted and separated from a medical image without requiring post-processing.

An aspect of the present embodiment provides an image segmentation and classification apparatus (medical image processing apparatus) for a tubular structure that performs segmentation and classification on an image having the tubular structure by using a neural network, including input means for inputting the image having the tubular structure, image pair production means for producing, on the basis of the input image, an image pair including a local image having local features of the tubular structure and a global image having global features of the tubular structure, and segmentation classification means for performing segmentation and classification on the image pair by using the neural network.

The present embodiment can perform segmentation and classification on a target region (for example, a tubular structure) based on a deep learning method in which both local features and global features are combined, and can be applied to many scenarios by a highly reliable deep learning method without requiring parameter adjustments and post-processing. According to the present embodiment, for example, long tubular structures such as blood vessels can be segmented, and arteries, veins, and the like can be classified with high accuracy.

Hereinafter, embodiments of a medical image processing apparatus, a method, and a storage medium according to the present application are described in detail with reference to the accompanying drawings. The medical image processing apparatus, the method, and the storage medium according to the present application are not limited by the following embodiments. In the following description, common reference numerals are assigned to similar components, and duplicate descriptions thereof are omitted.

First Embodiment

First, a medical image processing apparatus according to a first embodiment is described. The medical image processing apparatus according to the present embodiment may exist in the form of a medical image diagnostic apparatus such as an ultrasonic diagnostic apparatus or an MRI imaging apparatus, or may exist alone in the form of a workstation or the like. The following description is given for a case where a target region to be subjected to segmentation and classification by the medical image processing apparatus is a tubular structure.

Figure 1:
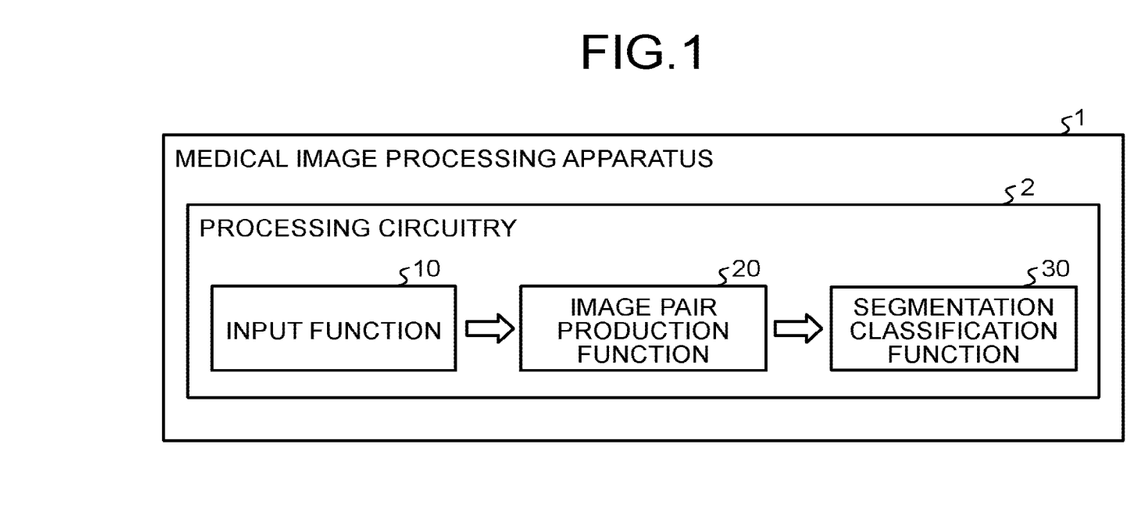
FIG. 1 is a block diagram illustrating an example of the configuration of a medical image processing apparatus according to a first embodiment.

FIG. 1 is a block diagram illustrating an example of the configuration of a medical image processing apparatus 1 according to the first embodiment. The medical image processing apparatus 1 according to the present embodiment performs segmentation and classification on an image having a tubular structure by using a neural network. As illustrated in FIG. 1, the medical image processing apparatus 1 includes processing circuitry 2, which mainly performs an input function 10 of inputting an image having a tubular structure, an image pair production function 20 of producing an image pair including a local image having local features of the tubular structure and a global image having global features of the tubular structure on the basis of the input image, and a segmentation classification function 30 of performing segmentation and classification on the image pair by the neural network.

The medical image processing apparatus 1 may be installed in, for example, a medical image diagnostic apparatus such as an ultrasonic diagnostic apparatus. In this case, the medical image processing apparatus 1 further includes an ultrasonic probe, a display, an input/output interface, an apparatus main body, and the like (not illustrated), and the processing circuitry 2, which performs the input function 10, the image pair production function 20, and the segmentation classification function 30, is communicably connected to these ultrasonic probe, display, input/output interface, apparatus main body, and the like and controls them. Since the configurations, functions, and the like of the ultrasonic probe, the display, the input/output interface, and the apparatus main body are well known to those skilled in the art, detailed descriptions thereof are omitted.

Hereinafter, details of each process performed by the medical image processing apparatus 1 according to the present embodiment are described.

Figure 2:
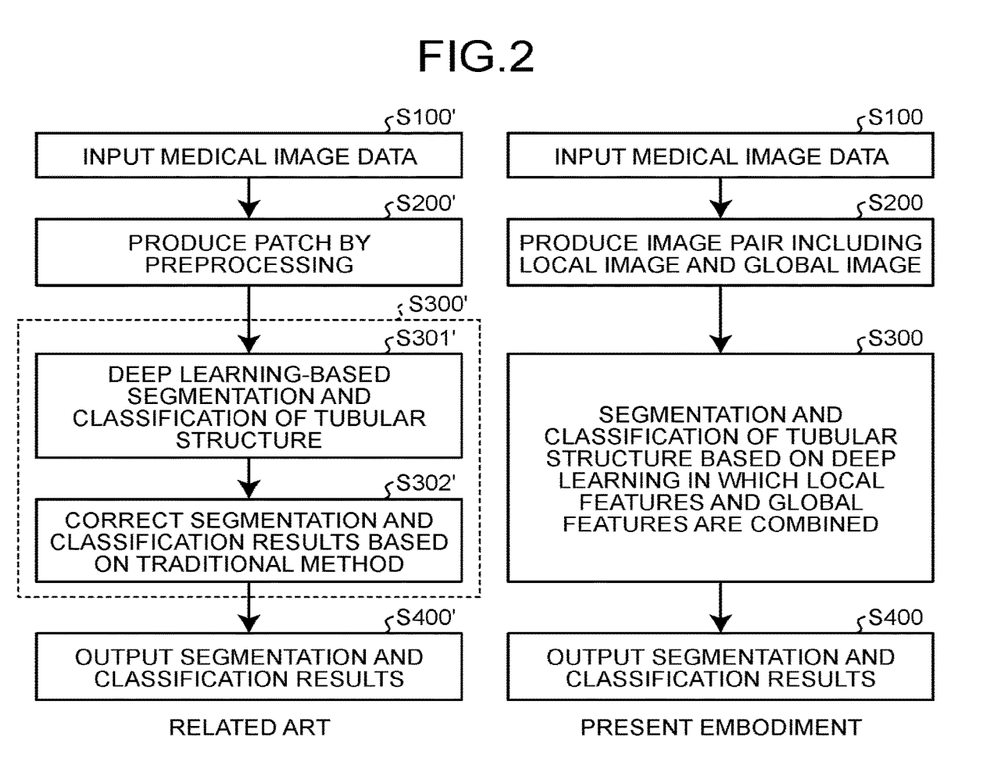
FIG. 2 is a comparison diagram for explaining features of a process performed by the medical image processing apparatus according to the first embodiment.

FIG. 2 is a comparison diagram for explaining features of a process performed by the medical image processing apparatus according to the first embodiment.

With reference to FIG. 2, the features of the process according to the present embodiment are described by comparing the present embodiment with the flow of the related art. In FIG. 2, the left side is a flowchart of segmentation and classification of a tubular structure according to the related art, and the right side is a flowchart of the process performed by the medical image processing apparatus according to the first embodiment. As illustrated in FIG. 2, step S200 and step S300 are characteristic steps in the present embodiment in the process performed by the medical image processing apparatus 1 according to the first embodiment. At step S200, the image pair production function 20 produces, on the basis of an input image, an image pair including a local image having local features of a tubular structure and a global image having global features of the tubular structure. Subsequently, at step S300, the segmentation classification function 30 performs deep learning-based segmentation and classification on the image pair produced by the image pair production function 20, and acquires image segmentation classification results for the tubular structure.

In the present embodiment, first, the image pair including the local image having the local features of the tubular structure and the global image corresponding to the local image and having the global features of the tubular structure is produced (step S200). Moreover, on the basis of the image pair, segmentation and classification of the tubular structure are performed by the deep learning using both the local features and the global features (step S300). As described above, the present embodiment is different from the related art that processes patches (step S200'), first performs segmentation and classification based on the patches (step S301'), and then corrects the segmentation and classification results (step S302'), and can acquire fine segmentation and classification results by a highly reliable deep learning method without requiring post-processing and parameter adjustments in the related art.

Hereinafter, the overall progress of the process of the medical image processing apparatus according to the present embodiment is described using blood vessels as an example with reference to FIG. 3 and FIG. 4.

Figure 3:
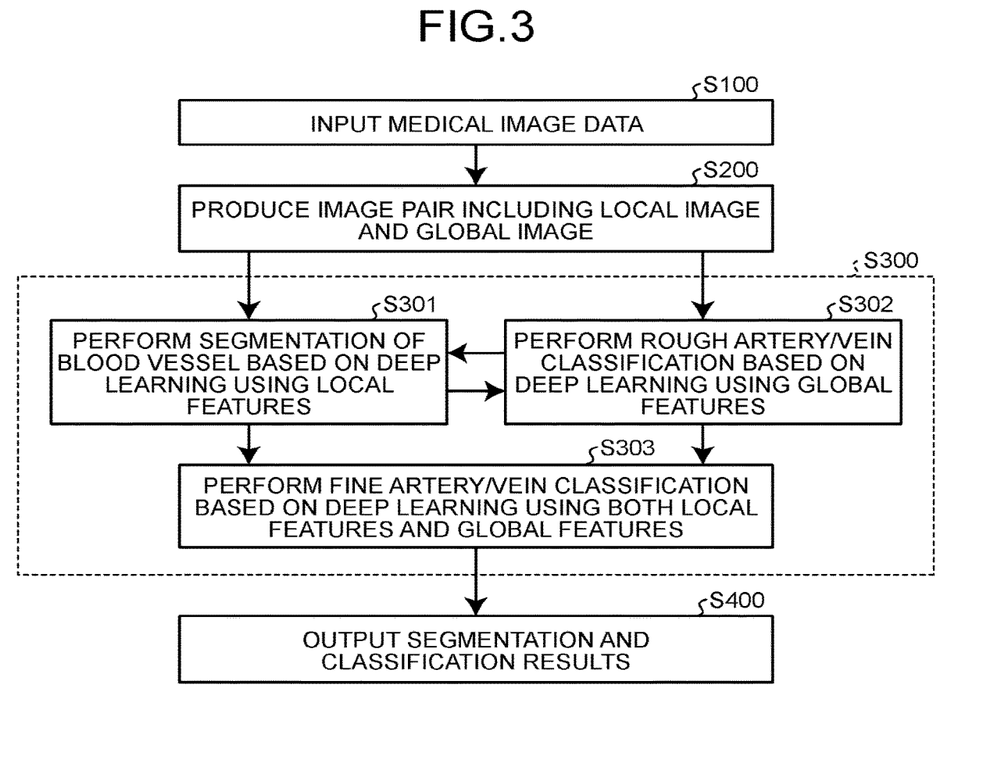
FIG. 3 is a flowchart illustrating an example of a blood vessel segmentation classification process performed by the medical image processing apparatus according to the first embodiment.

FIG. 3 is a flowchart illustrating an example of a blood vessel segmentation classification process performed by the medical image processing apparatus according to the first embodiment.

First, at step S100, medical image data including blood vessels to be processed is input to the medical image processing apparatus 1 by the input function 10.

Subsequently, at step S200, as preprocessing, the image pair production function 20 produces the image pair including the local image having the local features of the tubular structure and the global image corresponding to the local image and having the global features of the tubular structure. Details of the process at step S200 are described below with reference to FIG. 5.

Subsequently, as the process at step S300, the segmentation classification function 30 performs blood vessel segmentation based on the deep learning using the local features (step S301), rough artery/vein classification based on the deep learning using the global features (step S302), and fine artery/vein classification based on the deep learning using both the local features and the global features (step S303). Details of the process at step S300 are described below with reference to FIG. 6.

Finally, at step S400, the artery/vein segmentation classification results of the blood vessels are output.

The medical image processing apparatus 1 according to the first embodiment performs a deep learning-based blood vessel segmentation and classification process. Before describing each step of the segmentation and classification process in detail, the network structure of the medical image processing apparatus 1 according to the first embodiment is first described. FIG. 4 is a diagram illustrating the relationship between the network structure of the medical image processing apparatus 1 according to the first embodiment and steps of each process performed by the network structure.

Figure 4:
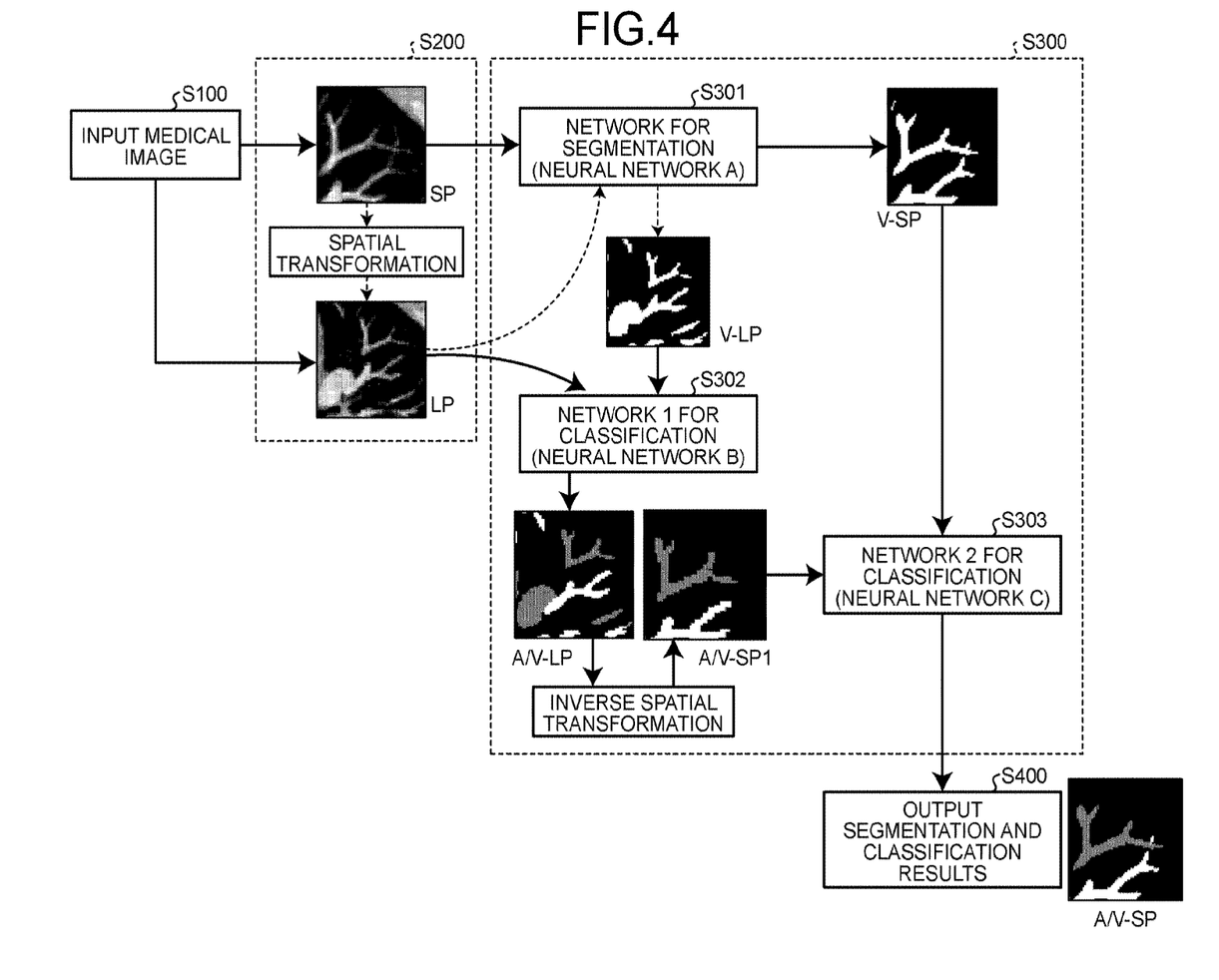
FIG. 4 is a diagram illustrating the relationship between the network structure of the medical image processing apparatus according to the first embodiment and steps of each process performed by the network structure.

As illustrated in FIG. 4, the network structure of the medical image processing apparatus 1 according to the first embodiment may include three deep neural networks such as a neural network for segmentation (neural network A) to perform the blood vessel segmentation using the local features at step S301, a neural network 1 for classification (neural network B) to perform the rough artery/vein classification using the global features at step S302, and a neural network 2 for classification (neural network C) to perform the fine artery/vein classification using both the local features and the global features at step S303.

After the medical image is input at step S100, the image pair production function 20 acquires an image pair including a local image SP having the local features of the tubular structure and a global image LP corresponding to the local image and having the global features of the tubular structure at step S200. A spatial transformation relationship exists between the local image SP and the global image LP.

Step S300 includes sub-steps S301 to S303.

First, at sub-step S301, the segmentation classification function 30 performs segmentation of the tubular structure on the local image SP and the global image LP included in the image pair by using the neural network for segmentation (neural network A), and acquires a mask image V-SP of the local image SP and a mask image V-LP of the global image LP. These two segmentation processes may be independent of each other, and in FIG. 4, data flows for the local image segmentation and the global image segmentation are indicated by solid and dotted arrows.

Subsequently, at sub-step S302, the segmentation classification function 30 uses the neural network 1 for classification (neural network B) to perform, for example, the rough artery/vein classification on the global image LP reflecting the global features and the mask image V-LP of the global image LP, and acquires a post-classification global classified image A/V-LP.

Subsequently, at sub-step S303, the segmentation classification function 30 takes, as input, a preliminary local classified image A/V-SP1 acquired by performing an inverse spatial transformation on the mask image V-SP of the local image SP and the global classified image A/V-LP, performs, for example, the fine artery/vein classification by using the neural network 2 for classification (neural network C), and acquires a post-fine classification local classified image A/V-SP.

Finally, at step S400, the processing circuitry 2 outputs the segmentation classification results.

This allows the deep learning-based segmentation classification process for tubular structures of the present embodiment to be applied to many scenarios by a highly reliable deep learning method, in which both local features and global features are combined, without requiring parameter adjustments and post-processing. According to the present embodiment, for example, long tubular structures such as blood vessels can be segmented, and arteries, veins, and the like can be classified with high accuracy.

Hereinafter, each step of the process performed by the medical image processing apparatus according to the first embodiment is described in detail with reference to FIGS. 5 to 9.

Figure 5:
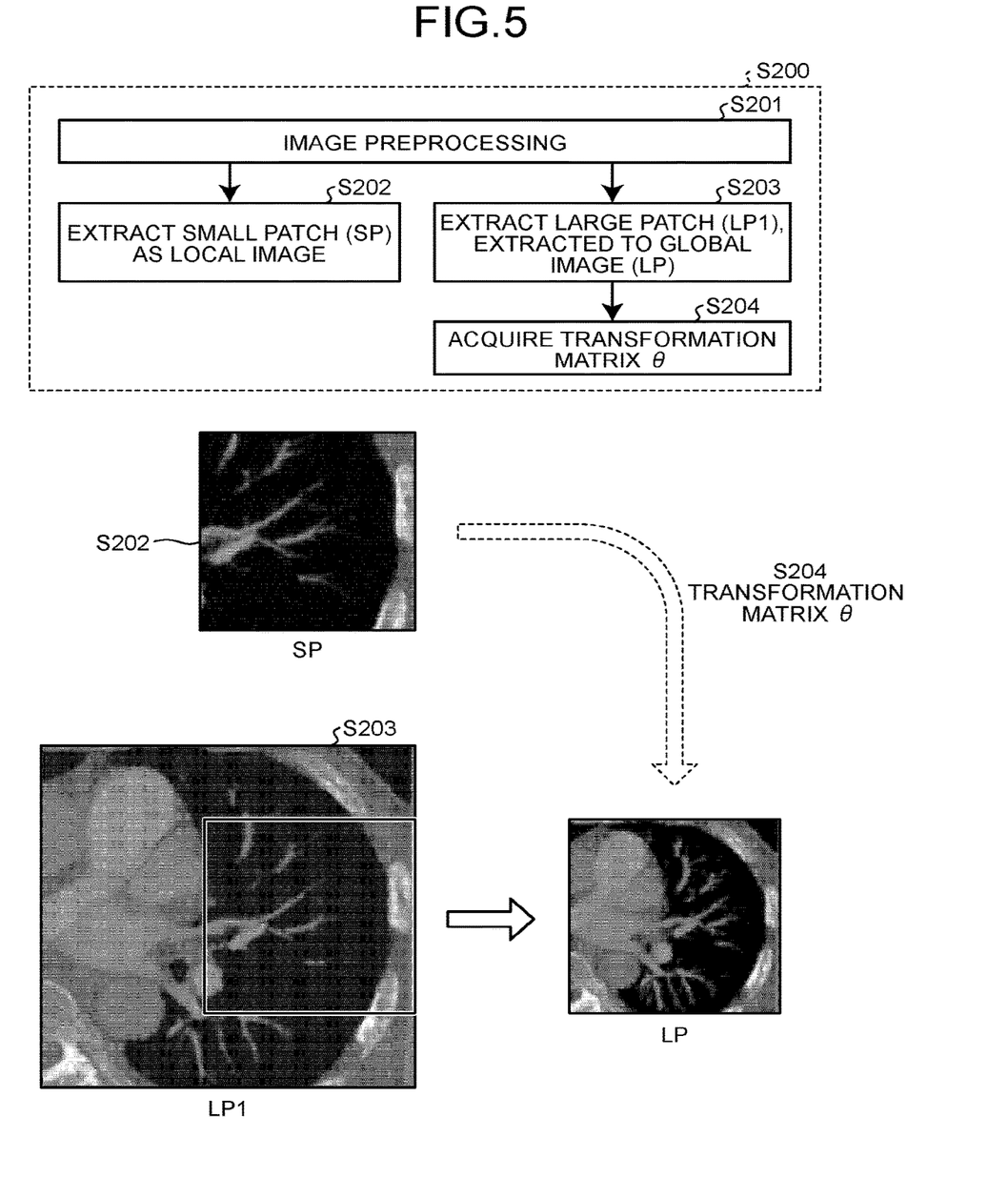
FIG. 5 is a diagram illustrating the processing procedure of step S200 performed by the medical image processing apparatus according to the first embodiment.

FIG. 5 is a diagram illustrating the processing procedure of step S200 performed by the medical image processing apparatus according to the first embodiment.

First, at step S201, the image pair production function 20 may perform image preprocessing on the medical image data input at step S100. The image preprocessing is intended to improve the reliability of feature extraction, and segmentation, classification, and the like of an image by removing irrelevant information in the image and recovering useful and truthful information. The image preprocessing at step S201 may include steps such as traditional grayscaling, geometric transformations, and image enhancement, and can be implemented by various methods in the related art, which is not described in detail. The preprocessing is not essential for the present embodiment, and the preprocessing step may be omitted depending on the situation.

Subsequently, at steps S202 and S203, the image pair production function 20 extracts, from the preprocessed image, a small patch SP having the local features of the blood vessel as a local image and a large patch LP1 having at least the small patch and the global features of the blood vessel as a preliminary global image. What are called the local features of the blood vessel are specifically features reflecting the local morphology of the blood vessel, for example, the shape, branching, and the like of an end of the blood vessel. What are called the global features of the blood vessel are specifically features reflecting the global morphology of the blood vessel, for example, the shape and branching of a root of the blood vessel and the shape, branching, and the like of an end of the blood vessel.

As illustrated in FIG. 5, the small patch extracted at step S202 includes the end of the target blood vessel, but does not include the root of the target blood vessel, and the large patch extracted at step S203 includes the small patch SP and the root of the target blood vessel as indicated by a frame in LP1 in FIG. 5. The method of extracting patches from input image data is not particularly limited and may be traditional methods such as sampling and cropping, which is not described here in detail.

At step S203, the image pair production function 20 further adjusts the size of the extracted large patch, that is, the preliminary global image LP1, and adjusts the image to an image LP whose file size is the same as that of the local image to make the image LP a global image. The size adjustment performed on the large patch may be implemented by downsampling and the like, or may be implemented by, for example, traditional geometric transformation methods, such as resolution adjustment and scaling, and is not particularly limited.

At step S204, the image pair production function 20 uses the global image LP acquired at step S203 and the local image SP acquired at step S202 to acquire a transformation matrix θ representing the spatial transformation relationship between the global image LP and the local image SP, and uses the transformation matrix θ for a subsequent process. Since the global image LP includes the local image SP, the global image LP and the local image SP may be regarded as images obtainable from each other by traditional spatial transformations such as scaling and cropping (note that an original image is also required in order to obtain the global image LP from the local image SP). The spatial transformation of the image can be implemented, for example, by a matrix operation, and a transformation matrix used to obtain the global image LP from the local image SP and the original image by the matrix operation is defined as the transformation matrix θ in the present invention. The transformation matrix θ is based on the global image LP and the local image SP, and can be determined by various methods in the related art, such as a matrix algorithm when the local image SP is transformed into the global image LP via a virtual spatial transformation (dotted arrow in FIG. 5 and the illustration of the original image is omitted).

According to the processes at steps S202 to S204 described above, the medical image processing apparatus 1 according to the first embodiment acquires the image pair including the local image SP having the local features of the blood vessel and the global image LP corresponding to the local image and having the global features of the blood vessel, and acquires the transformation matrix θ representing the spatial transformation relationship between the global image LP and the local image SP.

The above process of acquiring the image pair including the local image SP having the local features of the tubular structure and the global image LP corresponding to the local image and having the global features of the tubular structure is merely one example, and the method of acquiring the image pair at step S200 is not limited to the above process. An example of acquiring the local image SP and the global image LP by extracting the small patch and the large patch, respectively, at step S202 and step S203 has been described; however, it is of course that the local image SP and the global image LP can be acquired and the acquisition of the image pair can be implemented by other methods, for example. For example, the process at step S202 may be omitted, and a desired small patch may be acquired from the large patch LP1 extracted at step S203 as the local image SP by spatial transformations such as cropping. The size adjustment at step S203 is also not essential, and this point is described in detail later. It is sufficient if an image pair including the local image SP having the local features of the tubular structure and the global image LP corresponding to the local image and having the global features of the tubular structure is acquired on the basis of the present embodiment.

Figure 6:
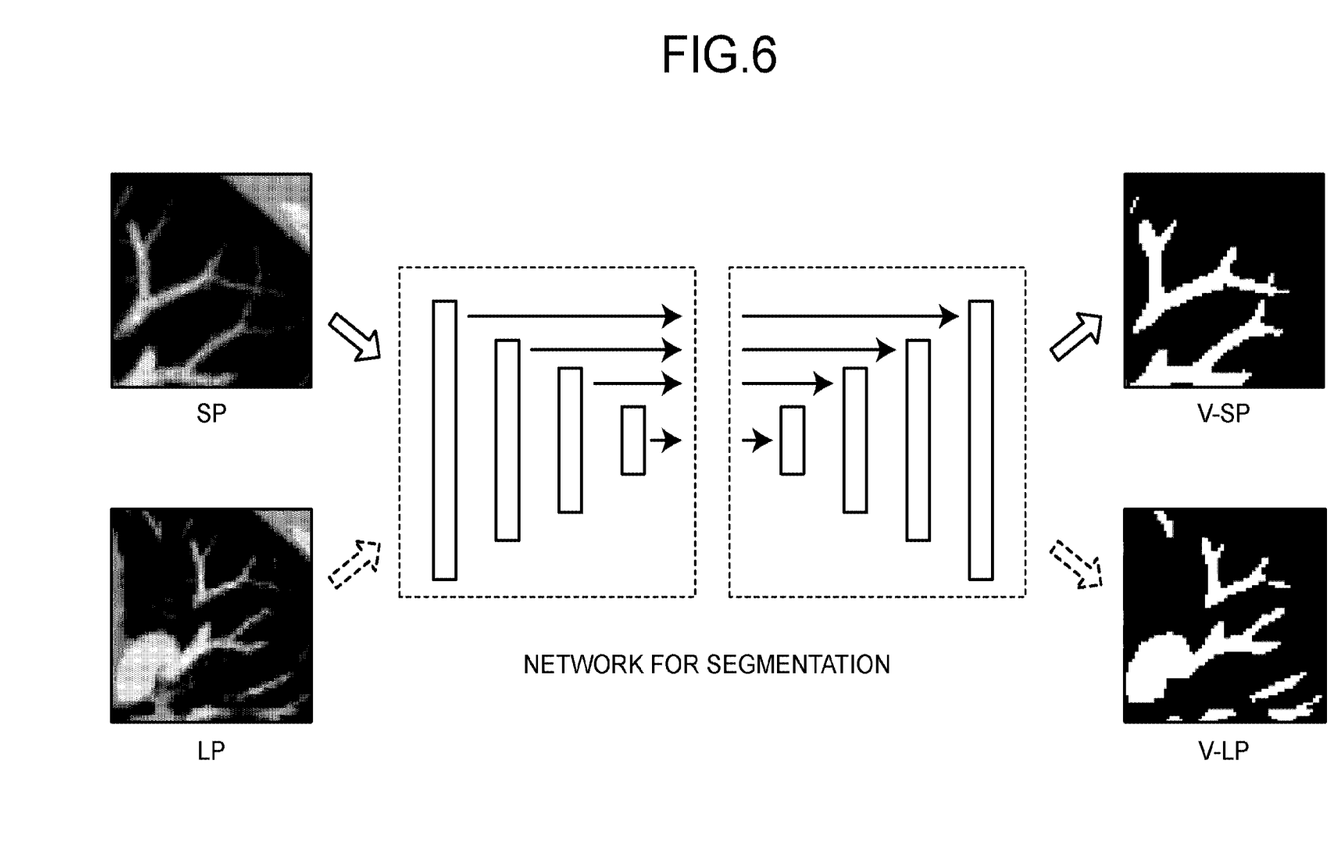
FIG. 6 is a diagram illustrating the processing procedure of step S301 performed by the medical image processing apparatus according to the first embodiment.

FIG. 6 is a diagram illustrating the processing procedure of step S301 performed by the medical image processing apparatus according to the first embodiment.

At step S301, a network for segmentation is used to segment the mask images of the blood vessel from the image pair. Specifically, the segmentation classification function 30 uses, for example, the neural network A such as U-Net, takes, as input, the local image SP and the global image LP in the image pair acquired at step S200, and segments the local mask image V-SP having the local features of the blood vessel and the global mask image V-LP having the global features of the blood vessel. Details of the deep neural network and the method for acquiring mask images by segmenting an image by using the deep neural network are well known in this field and are not described in detail. As described above with reference to FIG. 5, the global image LP is an image that is obtained by adjusting the size of the preliminary global image LP1 by downsampling or the like, and is less accurate than the local image SP is. Consequently, when segmenting the global image LP by using the neural network A, unlike the usual segmentation performed on the local image SP, the global image LP is allowed to enter the network A in only one direction in a training stage, and back propagation of loss is not allowed (that is, parameters are not adjusted using the output result of the global image LP in the training stage), so that performance degradation of the network A when optimization is repeated can be avoided. In FIG. 6, the segmentation of the global image LP and the segmentation of the local image SP are indicated by dotted and solid arrows, respectively.

Figure 7:
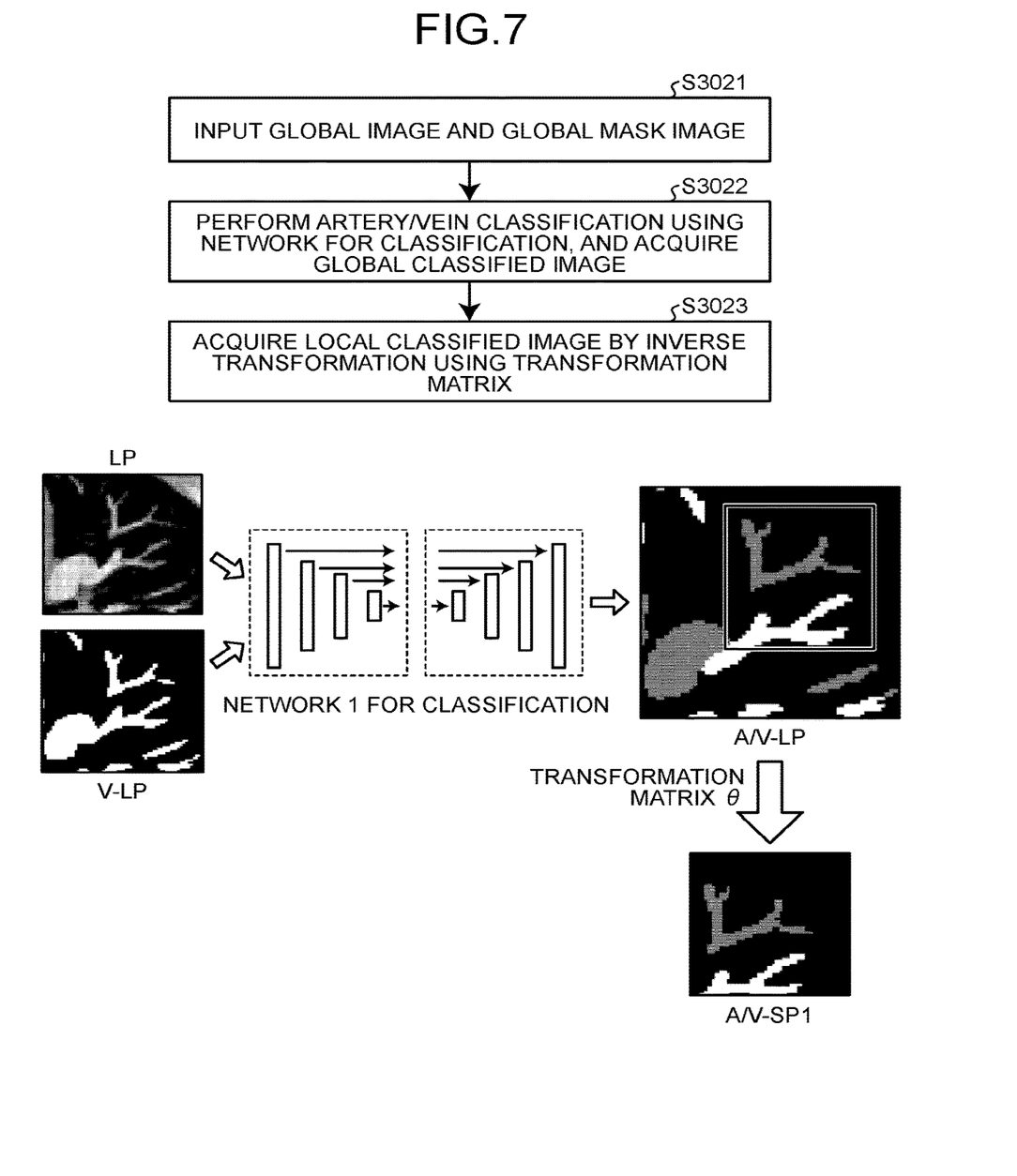
FIG. 7 is a diagram illustrating the processing procedure of step S302 performed by the medical image processing apparatus according to the first embodiment.

FIG. 7 is a diagram illustrating the processing procedure of step S302 performed by the medical image processing apparatus according to the first embodiment.

At step S302, the rough artery/vein classification is performed on the global image by using the network 1 for classification (network B), and the step S302 includes sub-steps S3021 to S3023.

Specifically, at sub-step S3021, the segmentation classification function 30 receives the global image LP acquired at step S200 and the global mask image V-LP acquired at step S301. At sub-step S3022, the segmentation classification function 30, using, for example, the neural network B such as U-Net, acquires the global classified image A/V-LP, which represents the artery/vein classification results of the blood vessels in the global image, by a classification algorithm on the basis of the global image LP and the global mask image V-LP. Since the global image has global features, classification performed based on the global image considers a global morphology including roots compared to classification using only local features, and thus fewer classification errors are made and more accurate artery/vein classification results and the like can be obtained. Details of the deep neural network and the method for classifying images by using the deep neural network are well known in this field and are not described in detail.

At sub-step S3023, the segmentation classification function 30 performs an inverse spatial transformation, which is the inverse of the virtual spatial transformation performed when the transformation matrix θ is obtained, on the global classified image A/V-LP acquired at sub-step S3022 by using the transformation matrix θ acquired at step S204, and acquires the preliminary local classified image A/V-SP1 representing the rough artery/vein classification results of the blood vessels in the local image.

The process at sub-step S3023 may be performed as follows. First, the size of the global classified image A/V-LP is adjusted according to the size of the already acquired preliminary global image LP1 by, for example, upsampling, so that the file size of the global classified image A/V-LP is the same as that of the preliminary global image LP1. Subsequently, the preliminary local classified image A/V-SP1 is acquired by performing an inverse spatial transformation on the size-adjusted global classified image on the basis of the transformation matrix θ. The inverse spatial transformation is the inverse of the virtual spatial transformation performed when the transformation matrix θ is obtained at step S204, and specifically, as illustrated in FIG. 7, the result of performing the inverse spatial transformation corresponds to cutting out an image corresponding to the size of SP from the size-adjusted global classified image by, for example, cropping.

At sub-step S3023, upsampling is first performed before the inverse spatial transformation. The upsampling is an inverse process corresponding to the downsampling at step S203, and neither of these two processes is essential; for example, when the downsampling at step S203 is omitted, the upsampling at sub-step S3023 may correspondingly be omitted. According to the upsampling at sub-step S3023 corresponding to the downsampling at step S203, the size of an image to be processed input to the network for segmentation and the size of an image to be processed input to the network 2 for classification are made the same, which can contribute to improving processing speed and processing accuracy and reducing the GPU memory usage.

In the classified images A/V-LP and A/V-SP1 in FIG. 7, the artery/vein classification results are represented by a color depth, and for example, veins are represented by dark-colored areas and arteries are represented by light-colored areas. Note that the display form in FIG. 7 is similarly applied to other drawings. The representation of the artery/vein classification results by a color depth, the representation of veins by dark-colored areas, and the representation of arteries by light-colored areas are merely examples, and the display form of veins and arteries is not limited thereto.

Figure 8:
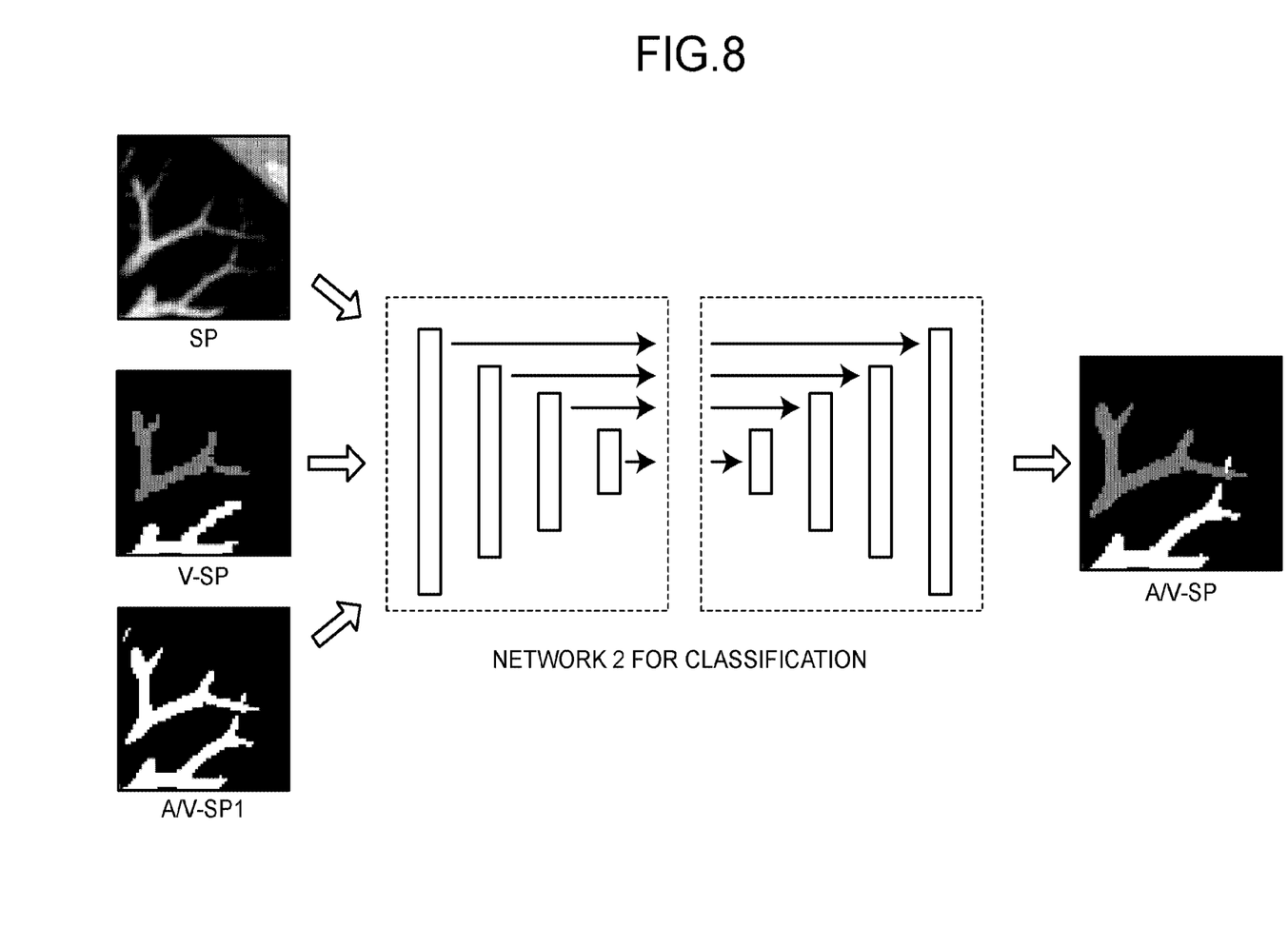
FIG. 8 is a diagram illustrating the processing procedure of step S303 performed by the medical image processing apparatus according to the first embodiment.

FIG. 8 is a diagram illustrating the processing procedure of step S303 performed by the medical image processing apparatus according to the first embodiment.

At step S303, the fine artery/vein classification is performed on the local image by using the network 2 for classification (network C). Specifically, in order to acquire the fine artery/vein classification results, the segmentation classification function 30 beforehand takes, as input, the local image SP acquired at step S200, the local mask image V-SP acquired at step S301, and the preliminary local classified image A/V-SP1 acquired at step S302, and performs the artery/vein classification process by using, for example, the neural network C such as U-Net.

As described above, the local mask image V-SP acquired at step S301 is a mask image acquired by segmentation based on the deep learning network by using a direct local image, which reflects an accurate segmentation result including the local features of the target blood vessel. On the other hand, the preliminary local classified image A/V-SP1 acquired at step S302 is obtained from the result of classification based on the deep learning network using global features such as blood vessel root features, and classification using global features such as blood vessel roots considers a global morphology including roots compared to classification using only local features, and thus more accurate artery/vein classification results can be obtained. At step S303, both the local mask image V-SP reflecting the segmentation result of the target blood vessel having the local features and the preliminary local classified image A/V-SP1 reflecting the classification result of the target blood vessel having the global features are taken as input and the local features and the global features are combined, so that it is possible to correct a classification error at, for example, an edge of the blood vessel in the preliminary local classified image A/V-SP1 based on the local mask image V-SP, and to acquire more accurate artery/vein segmentation and classification results for the target blood vessel.

Since the medical image processing apparatus according to the first embodiment combines local features and global features, for example, it does not require parameter adjustments and post-processing in the artery/vein segmentation classification process of blood vessels based on deep learning and can be applied to many scenarios by a highly reliable deep learning method. According to the present embodiment, for example, long tubular structures such as blood vessels can be segmented, and arteries, veins, and the like can be classified with high accuracy. In the present embodiment in which local features and global features are combined, in spite of the local patch and the global patch, segmentation and classification are more accurate than in methods using only a single patch size.

The medical image processing apparatus according to the first embodiment can reduce the GPU memory usage during frame learning because the size of an input image is small.

While the first embodiment has been described above, various other embodiments can be implemented in different forms, in addition to the first embodiment described above.

Second Embodiment

The first embodiment described above is an example of a complete process including image preprocessing, blood vessel segmentation, rough artery/vein classification, and fine artery/vein classification. However, embodiments are not limited thereto, and for example, the fine classification process at step S303 according to the first embodiment can be modularized alone, that is, in order to acquire fine artery/vein classification results, target blood vessel segmentation results and rough artery/vein classification results acquired by other methods may be directly input to a deep learning-based neural network for classification. The following is a description of the second embodiment, in which the fine classification process is modularized alone, using FIG. 9 as an example.

Figure 9:
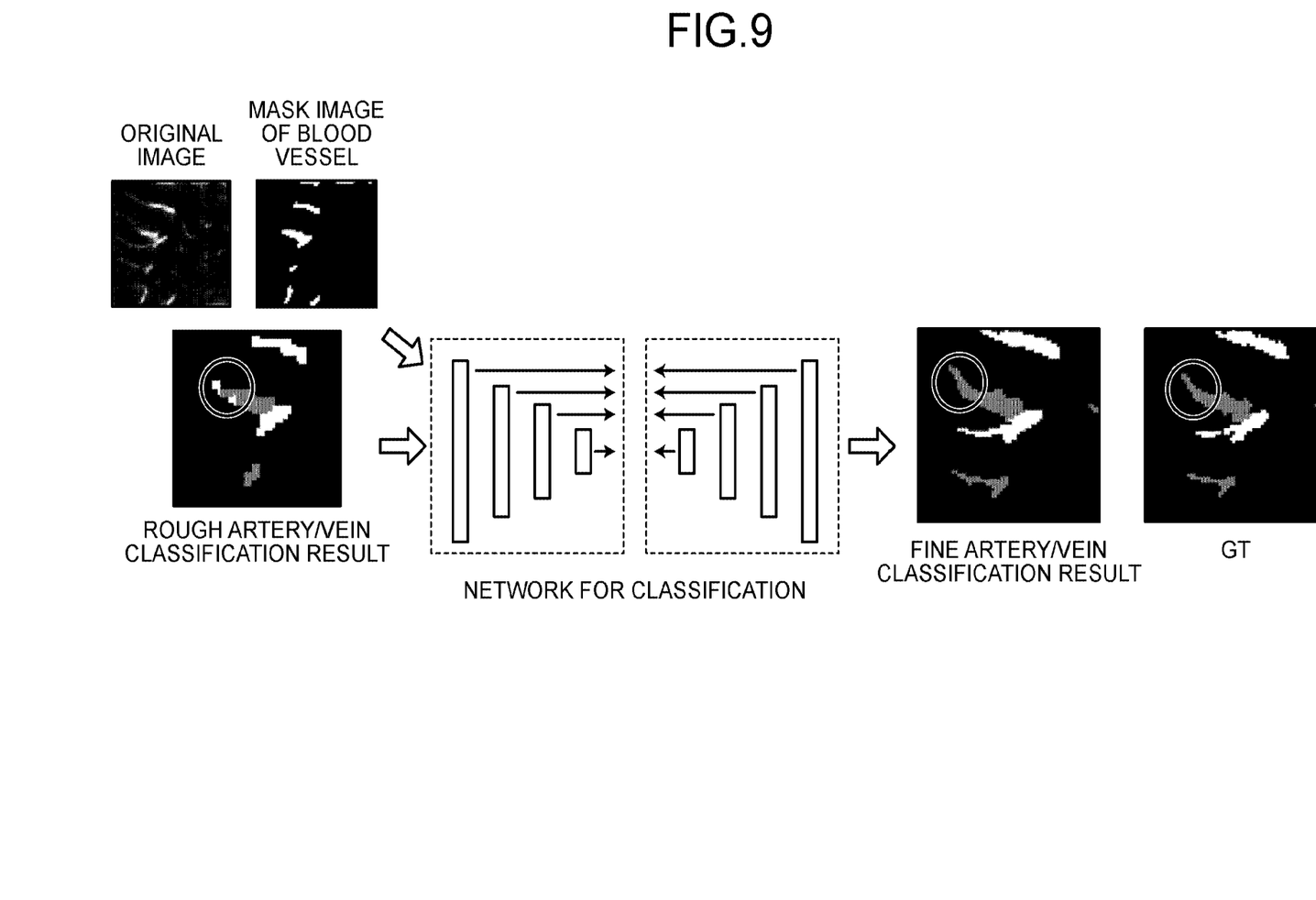
FIG. 9 is a diagram illustrating an example of a blood vessel classification process performed by a medical image processing apparatus according to a second embodiment.

FIG. 9 is a diagram illustrating an example of a blood vessel classification process performed by a medical image processing apparatus according to the second embodiment, and the second embodiment is described while focusing on the differences from the first embodiment described above. In the description of the second embodiment, the same reference numerals are assigned to the same configurations as those of the first embodiment, and descriptions thereof are omitted.

The medical image processing apparatus according to the second embodiment acquires fine artery/vein classification results of blood vessels by directly inputting, to a neural network for classification, an original image of the target blood vessels acquired in advance by other methods, mask images of the target blood vessels acquired by performing segmentation on the original image, and rough artery/vein classification result images of the target blood vessels acquired by performing classification on the original image.

As illustrated in FIG. 9, for example, a rough classification result of vein terminals surrounded by circles clearly includes errors, and since the neural network for classification can correct these classification errors on the basis of the segmentation results of the target blood vessels, a clearer classification result is acquired by the method according to the second embodiment and is closer to the ground truth (GT).

Compared to the first embodiment, in the second embodiment, since a fine blood vessel classification module is used alone as a post-processing module, the fine artery/vein classification module is applied alone to a system in the related art, thereby exhibiting a beneficial technical effect of being able to acquire a highly reliable classification result in addition to the effects of the first embodiment.

The above-described embodiments have been described using the example of classification of blood vessels and arteries/veins; however, the present disclosure can be applied to tubular structures other than blood vessels and classification other than arteries/veins, similarly to the embodiments described above. For example, when applied to hepatic vessels, hepatic veins and portal veins are set as different types of hepatic vessels, and the application of the above-described embodiments can result in accurate segmentation and classification of the hepatic veins and the portal veins. A target region is not limited to the tubular structure described above, and any portion may be used as the target region as long as it is subjected to segmentation and classification.

In the embodiments described above, the neural network A, the neural network B, and the neural network C have been described using U-Net as an example; however, the neural network A, the neural network B, and the neural network C are not limited to U-Net and may be other convolutional neural networks or other deep learning networks. The neural network A, the neural network B, and the neural network C may be the same type of neural network, or may be different types of neural networks.

The image processing, segmentation, classification, training and inference of deep learning neural networks, and the like described in the above-described embodiments can all be implemented by the related methods in the related art and are not described in detail.

The embodiments may be implemented as the medical image processing apparatus described above, or implemented as a segmentation classification method of a target region (for example, a tubular structure), a computer program, or a medium storing therein a segmentation classification program of the target region (for example, a tubular structure).

The medical image processing apparatus according to this application may be incorporated in a medical image diagnostic apparatus, or may perform processes alone. In such a case, the medical image processing apparatus includes processing circuitry 2 that performs the same process as in each step described above, and a memory that stores therein computer programs corresponding to respective functions, various information, and the like. The processing circuitry 2 acquires two-dimensional or three-dimensional medical image data from a medical image diagnostic apparatus such as an ultrasonic diagnostic apparatus or an image storage apparatus via a network, and performs the above-described process by using the acquired medical image data. The processing circuitry 2 is a processor that reads the computer programs from the memory and executes the read computer programs, thereby implementing functions corresponding to the executed computer programs.

The term "processor" used in the above description, for example, means circuitry such as a central processing unit (CPU), a graphics processing unit (GPU), an application specific integrated circuit (ASIC), or a programmable logic device (for example, a simple programmable logic device (SPLD), a complex programmable logic device (CPLD), and a field programmable gate array (FPGA)). The processor implements the functions by reading and executing the computer programs stored in the memory. Instead of storing the computer programs in the memory, the computer programs may be directly incorporated in the circuitry of the processor. In this case, the processor implements the functions by reading and executing the computer programs incorporated in the circuitry. Each processor of the embodiments is not limited to being configured as single piece of circuitry for each processor, and one processor may be configured by combining a plurality of pieces of independent circuitry to implement the functions thereof.

In the description of the above embodiments, each component of each apparatus illustrated in the drawings is a functional concept, and does not necessarily have to be physically configured as illustrated in the drawings. That is, the specific form of distribution or integration of each apparatus is not limited to those illustrated in the drawings, but can be configured by functionally or physically distributing or integrating all or part thereof in arbitrary units, depending on various loads and use conditions. Moreover, all or some of the processing functions performed by each apparatus can be implemented by a CPU and a computer program that is analyzed and executed by the CPU, or by hardware using wired logic.

The processing method described in the embodiments described above can be implemented by executing a processing program prepared in advance on a computer such as a personal computer or workstation. This processing program can be delivered via a network such as the Internet. The processing program can also be recorded on a non-transitory computer-readable recording medium such as a hard disk, a flexible disk (FD), a CD-ROM, an MO, a DVD, a USB memory, and a flash memory such as an SD card memory, and can be executed by being read from the non-transitory recording medium by a computer.

According to at least one of the embodiments described above, segmentation and classification of a target region can be performed more accurately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus comprising:
processing circuitry configured to
receive a medical image of a target region,
generate an image pair including a local image having local features of the target region and a global image having global features of the target region on the basis of the received medical image,
perform segmentation using a first neural network to locate the target region in the local image,
perform classification using a second neural network to classify the target region in the global image by type, the classification for the global image being a rough classification that roughly classifies the type of target region, and input a segmentation result and a classification result into a third neural network to generate a classified image of the target region, the classified image of the target region being an image in which the type of target region is precisely classified.

2. The medical image processing apparatus according to claim 1, wherein the processing circuitry is configured to
acquire a local mask image by performing the segmentation of the target region on the local image by a first deep learning network,
acquire a global classified image by performing the classification of the target region on the global image by a second deep learning network, and
generate the classified image of the target region on the basis of the local mask image and the global classified image.

3. The medical image processing apparatus according to claim 2, wherein the processing circuitry is configured to perform
a process of acquiring the local mask image of the target region by performing segmentation on the local image by the first deep learning network,
a process of acquiring a global mask image of the target region by performing segmentation on the global image by the first deep learning network,
a process of generating the global classified image of the target region by the second deep learning network on the basis of the global image and the global mask image;
a process of extracting a portion corresponding to the local image from the global classified image as a local classified image; and
a process of generating the classified images of the target region by a third deep learning network by using the local image, the local mask image, and the local classified image.

4. The medical image processing apparatus according to claim 3, wherein
the target region is a tubular structure, and
the processing circuitry is configured to perform
a process of extracting an image including a local structure other than a root of the tubular structure from the medical image subjected to preprocessing as the local image,
a process of extracting an image including at least the local image and the root of the tubular structure from the medical image subjected to the preprocessing as a preliminary global image, and
a process of generating an image having a file size identical to a file size of the local image as the global image by performing downsampling on the preliminary global image.

5. The medical image processing apparatus according to claim 4, wherein, when extracting the local classified image, the processing circuitry is configured to
perform upsampling corresponding to the downsampling on the global classified image,
acquire a preliminary global classified image having a file size identical to a file size of the preliminary global image, and
extract the local classified image from the preliminary global classified image by using a transformation matrix representing a relationship between the global image and the local image.

6. The medical image processing apparatus according to claim 1, wherein
the target region is blood vessels, and
the processing circuitry is configured to classify the blood vessels into venous blood vessels and arterial blood vessels.

7. A medical image processing apparatus comprising:
processing circuitry configured to
receive a medical image including a target region, a mask image acquired by performing segmentation using a first neural network to locate the target region on the medical image, and a roughly classified image acquired by performing rough classification using a second neural network to classify the target region on the medical image by type, and
generate a classified image, in which the type of the target region is precisely classified, by a third neural network by using the received medical image, the received mask image, and the received roughly classified image.

8. A method comprising:
receiving a medical image of a target region;
generating an image pair including a local image having local features of the target region and a global image having global features of the target region on the basis of the received medical image;
performing segmentation using a first neural network to locate the target region in the local image;
performing classification using a second neural network to classify the target region in the global image by type, the classification for the global image being a rough classification that roughly classifies the type of target region; and
inputting a segmentation result and a classification result into a third neural network to generate a classified image of the target region, the classified image of the target region being an image in which the type of target region is precisely classified.

9. A non-transitory computer readable storage medium comprising instructions that cause a computer to execute:
receiving a medical image of a target region;
generating an image pair including a local image having local features of the target region and a global image having global features of the target region on the basis of the received medical image;
performing segmentation using a first neural network to locate the target region in the local image;
performing classification using a second neural network to classify the target region in the global image by type, the classification for the global image being a rough classification that roughly classifies the type of target region; and
inputting a segmentation result and a classification result into a third neural network to generate a classified image of the target region, the classified image of the target region being an image in which the type of target region is precisely classified.

* * * * *